US008577993B2

(12) United States Patent
Gao et al.

(10) Patent No.: US 8,577,993 B2
(45) Date of Patent: Nov. 5, 2013

(54) CACHING PROVENANCE INFORMATION

(75) Inventors: Wei Gao, State College, PA (US); Arun K. Iyengar, Yorktown Heights, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/112,222

(22) Filed: May 20, 2011

(65) Prior Publication Data

US 2012/0297008 A1 Nov. 22, 2012

(51) Int. Cl.
G06F 15/16 (2006.01)

(52) U.S. Cl.
USPC ............................................................ 709/217

(58) Field of Classification Search
USPC ............................................................ 709/217
See application file for complete search history.

(56) References Cited

U.S. PATENT DOCUMENTS

| 6,256,712 | B1 | 7/2001 | Challenger et al. | |
| 6,633,891 | B1 * | 10/2003 | Bamford et al. | 1/1 |
| 6,751,608 | B1 * | 6/2004 | Cohen et al. | 1/1 |
| 7,103,725 | B2 * | 9/2006 | Glasco | 711/141 |
| 7,107,408 | B2 * | 9/2006 | Glasco | 711/141 |
| 7,107,409 | B2 * | 9/2006 | Glasco | 711/141 |
| 7,818,402 | B1 * | 10/2010 | Zhang | 709/219 |
| 7,865,583 | B2 * | 1/2011 | Cohen et al. | 709/223 |
| 7,890,549 | B2 * | 2/2011 | Elad et al. | 707/803 |
| 8,087,063 | B2 * | 12/2011 | Martin et al. | 726/2 |
| 8,108,330 | B2 * | 1/2012 | Li et al. | 706/45 |
| 8,290,960 | B2 * | 10/2012 | Li et al. | 707/748 |
| 8,392,661 | B1 * | 3/2013 | Metcalf | 711/133 |
| 8,443,189 | B2 * | 5/2013 | Li et al. | 713/166 |
| 2006/0136671 | A1 | 6/2006 | Balakrishnan et al. | |
| 2007/0088957 | A1 * | 4/2007 | Carson | 713/176 |
| 2008/0097816 | A1 * | 4/2008 | Freire et al. | 705/9 |
| 2008/0147975 | A1 | 6/2008 | Zimmer et al. | |
| 2009/0172294 | A1 | 7/2009 | Fryman et al. | |
| 2009/0199090 | A1 * | 8/2009 | Poston et al. | 715/255 |
| 2010/0070463 | A1 * | 3/2010 | Zhao et al. | 707/608 |
| 2010/0106681 | A1 | 4/2010 | Povzner et al. | |
| 2010/0122012 | A1 | 5/2010 | Gebara et al. | |
| 2010/0250689 | A1 * | 9/2010 | Dill et al. | 709/206 |

(Continued)

OTHER PUBLICATIONS

Moreau, L. et al., The Open Provenance Model: An Overview, 2008, Springer-Verlag Berlin Heidelberg, IPAW 2008, LNCS 5272, pp. 323-326.*

(Continued)

*Primary Examiner* — Alicia Baturay
(74) *Attorney, Agent, or Firm* — Preston J. Young; Ryan, Mason & Lewis, LLP

(57) ABSTRACT

Techniques are disclosed for caching provenance information. For example, in an information system comprising a first computing device requesting provenance data from at least a second computing device, a method for improving the delivery of provenance data to the first computing device, comprises the following steps. At least one cache is maintained for storing provenance data which the first computing device can access with less overhead than accessing the second computing device. Aggregated provenance data is produced from input provenance data. A decision whether or not to cache input provenance data is made based on a likelihood of the input provenance data being used to produce aggregated provenance data. By way of example, the first computing device may comprise a client and the second computing device may comprise a server.

25 Claims, 6 Drawing Sheets

(56) References Cited

U.S. PATENT DOCUMENTS

| | | | |
|---|---|---|---|
| 2010/0250932 A1* | 9/2010 | Dill et al. | 713/168 |
| 2010/0251367 A1* | 9/2010 | Dill et al. | 726/22 |
| 2010/0251374 A1* | 9/2010 | Dill et al. | 726/25 |
| 2011/0295854 A1* | 12/2011 | Chiticariu et al. | 707/737 |
| 2013/0109358 A1* | 5/2013 | Balasubramaniyan et al. | 455/411 |

OTHER PUBLICATIONS

Gehani et al., Efficient Querying of Distributed Provenance Stores, 2010, ACM: HPDC '10 Proceedings of the 19th ACM International Symposium on High Performance Distributed Computing, pp. 613-621.*

What Is Provenance: From XG Provenance Wiki, Nov. 18, 2010, World Wide Web Consortium (W3C), pp. 1-4.*

A. Balasubramanian et al., "DTN Routing as a Resource Allocation Problem," Proceedings of the Conference on Applications, Technologies, Architectures, and Protocols for Computer Communications, SIGCOMM, Aug. 2007, pp. 373-384, Kyoto, Japan.

L. Breslau et al., "Web Caching and Zipf-Like Distributions: Evidence and Implications," Proceedings of the 18th Annual Joint Conference of the IEEE Computer and Communications Societies, INFOCOM, Mar. 1999, pp. 126-134, vol. 1.

J. Burgess et al., "MaxProp: Routing for Vehicle-Based Disruption-Tolerant Networks," Proceedings of the 25th IEEE International Conference on Computer Communications, Joint Conference of the IEEE Computer and Communications Societies, INFOCOM, Apr. 2006, pp. 1688-1698, Barcelona, Catalunya, Spain.

H. Cai et al., "Crossing Over the Bounded Domain: From Exponential to Power-Law Inter-Meeting Time in MANET," Proceedings of the 13th Annual ACM International Conference on Mobile Computing and Networking (MobiCom), Sep. 2007, pp. 159-170, Montreal, Quebec, Canada.

A. Chaintreau et al., "Impact of Human Mobility on Opportunistic Forwarding Algorithms," IEEE Transactions on Mobile Computing, Jun. 2007, pp. 606-620, vol. 6, No. 6.

P. Costa et al., "Socially-Aware Routing for Publish-Subscribe in Delay-Tolerant Mobile Ad Hoc Networks," IEEE Journal on Selected Areas in Communications, Jun. 2008, pp. 748-760, vol. 26, No. 5.

E. Daly et al., "Social Network Analysis for Routing in Disconnected Delay-Tolerant MANETs," Proceedings of the 8th ACM International Symposium on Mobile Ad Hoc Networking and Computing (MobiHoc), Sep. 2007, pp. 32-40, Montreal, Quebec, Canada.

V. Erramilli et al., "Delegation Forwarding," Proceedings of the 9th ACM International Symposium on Mobile Ad Hoc Networking and Computing (MobiHoc), May 2008, pp. 251-259, Hong Kong SAR, China.

Kevin Fall, "A Delay-Tolerant Network Architecture for Challenged Internets," Proceedings of the Conference on Application, Technologies, Architectures, and Protocols for Computer Communications, Aug. 2003, pp. 27-34, Karlsruhe, Germany.

L. Fan et al., "Summary Cache: A Scalable Wide-Area Web Cache Sharing Protocol," IEEE/ACM Transactions on Networking, Jun. 2000, pp. 281-293, vol. 8, No. 3.

W. Gao et al., "Supporting Cooperative Caching in Disruption Tolerant Networks," To appear in Proceedings of the 31st IEEE International Conference on Distributed Computing Systems (ICDCS), Jun. 2011, 11 pages, Minneapolis Minnesota.

W. Gao et al., "Multicasting in Delay Tolerant Networks: A Social Network Perspective," Proceedings of the 10th ACM International Symposium on Mobile Ad Hoc Networking and Computing (MobiHoc), May 2009, pp. 299-308, New Orleans, Louisiana.

F. Geerts et al., "MONDRIAN: Annotating and Querying Databases Through Colors and Blocks," Proceedings of the 22nd International Conference on Data Engineering (ICDE), Apr. 2006, 22 pages.

T.J. Green et al., "Provenance Semirings," Proceedings of the 26th ACM SIGMOD-SIGACT-SIGART Symposium on Principles of Database Systems (PODS), Jun. 2007, pp. 31-40, Beijing, China.

Y. Huang et al., "Optimizing File Retrieval in Delay-Tolerant Content Distribution Community," 29th IEEE International Conference on Distributed Computing Systems (ICDCS), Jun. 2009, pp. 308-316, Montreal, Quebec, Canada.

P. Hui et al., "BUBBLE Rap: Social Based Forwarding in Delay Tolerant Networks," Proceedings of the 9th ACM International Symposium on Mobile Ad Hoc Networking and Computing (MobiHoc), May 2008, pp. 241-250, Hong Kong SAR, China.

S. Ioannidis et al., "Optimal and Scalable Distribution of Content Updates Over a Mobile Social Network," IEEE INFOCOM, Apr. 2009, pp. 1422-1430, Rio de Janeiro, Brazil.

T. Karagiannis et al., "Power Law and Exponential Decay of Inter Contact Times Between Mobile Devices," Proceedings of the 13th Annual ACM International Conference on Mobile Computing and Networking (MobiCom), Sep. 2007, pp. 183-194, Montreal, Quebec, Canada.

U. Lee et al., "RelayCast: Scalable Multicast Routing in Delay Tolerant Networks," IEEE International Conference on Network Protocols (ICNP), Oct. 2008, pp. 218-227, Orlando, Florida.

M.J. Pitkänen et al., "Redundancy and Distributed Caching in Mobile DTNs," Proceedings of 2nd ACM/IEEE International Workshop on Mobility in the Evolving Internet Architecture (MobiArch), Aug. 2007, 7 pages, Kyoto, Japan.

T. Spyropoulos et al., "Spray and Wait: An Efficient Routing Scheme for Intermittently Connected Mobile Networks," Proceedings of the ACM ASIGCOMM Workshop on Delay-Tolerant Networking (WDTN), Aug. 2005, pp. 252-259, Philadelphia, Pennsylvania.

D. Srivastava et al., "Intensional Associations Between Data and Metadata," Proceedings of the ACM SIGMOD International Conference on Management of Data (SIGMOD), Jun. 2007, 12 pages, Beijing, China.

Wang Chiew Tan, "Provenance in Databases: Past, Current, and Future," IEEE Data Engineering Bulletin, Dec. 2007, pp. 3-12, vol. 30, No. 4.

A. Vahdat et al., "Epidemic Routing for Partially-Connected Ad Hoc Networks," Technical Report CS-200006, Duke University, Apr. 2000, 14 pages.

D. Wessels et al., "ICP and the Squid Web Cache," IEEE Journal on Selected Areas in Communications (JSAC), Apr. 1998, pp. 345-357, vol. 16, No. 3.

L. Yin et al., "Supporting Cooperative Caching in Ad Hoc Networks," IEEE Transactions on Mobile Computing, Jan. 2006, pp. 77-89, vol. 5, No. 1.

Q. Yuan et al., "Predict and Relay: An Efficient Routing in Disruption-Tolerant Networks," Proceedings of the 10th ACM International Symposium on Mobile Ad Hoc Networking and Computing (MobiHoc), May 2009, New Orleans, Louisiana.

H. Zhu et al., "Recognizing Exponential Inter-Contact Time in VANETs," Proceedings of IEEE INFOCOM, Mar. 2010, pp. 1-5, San Diego, California.

* cited by examiner

TRACE SUMMARY

| TRACE | Infocom05 | Infocom06 | MIT REALITY | UCSD |
|---|---|---|---|---|
| NETWORK TYPE | BLUETOOTH | BLUETOOTH | BLUETOOTH | WiFi |
| NUMBER OF DEVICES | 41 | 78 | 97 | 275 |
| NUMBER OF INTERNAL CONTACTS | 22,459 | 182,951 | 114,046 | 123,225 |
| DURATION (DAYS) | 3 | 4 | 246 | 77 |
| GRANULARITY (SECS) | 120 | 120 | 300 | 20 |
| PAIRWISE CONTACT FREQUENCY (PER DAY) | 4.6 | 6.7 | 0.024 | 0.036 |

CACHING PROVENANCE INFORMATION

This invention was made with Government support under Contract No.: W911NF-09-2-0053 awarded by Army Research Office (ARO). The Government has certain rights in this invention.

FIELD OF THE INVENTION

The present invention relates generally to information systems and, more particularly, to techniques for caching provenance information.

BACKGROUND OF THE INVENTION

Information systems are computer-based systems that obtain, process, store and/or output various forms of data depending on the purpose of the system. Users rely on information systems every day to provide accurate data for critical and non-critical purposes.

One example might involve a doctor or other health professional requesting a patient record from a hospital database (information system). Another example might be an accountant or other tax professional requesting a tax record for a client from a tax return database (information system). Yet another example might be a website user requesting a web page containing some transaction-specific information from the website (information system). It is important to note that such examples of information systems may comprise multiple servers distributed in remote locations.

In the example cases above, it may also be important for the user (doctor, accountant or website user) to review information pertaining to how the record he/she has requested (patient record, tax record or web page) was derived or from what source(s) it was obtained. This additional information is typically referred to as provenance information.

SUMMARY OF THE INVENTION

Principles of the invention provide techniques for caching provenance information.

For example, in an information system comprising a first computing device requesting provenance data from at least a second computing device, a method for improving the delivery of provenance data to the first computing device, comprises the following steps. At least one cache is maintained for storing provenance data which the first computing device can access with less overhead than accessing the second computing device. Aggregated provenance data is produced from input provenance data. A decision whether or not to cache input provenance data is made based on a likelihood of the input provenance data being used to produce aggregated provenance data. In one embodiment, the first computing device may comprise a client and the second computing device may comprise a server.

Further, the at least one cache may be maintained by at least one network central location in the given network. The at least one network central location may be selected based on its accessibility by one or more other nodes within the given network. Still further, a marginal provenance level or score for the data item is computed and used to prioritize storage of the data item closer to the at least one network central location.

Advantageously, illustrative principles of the invention provide for provenance information to be distributed more efficiently throughout the information system.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 depicts a trace summary recorded in accordance with an embodiment of the invention.

DETAILED DESCRIPTION

Figure 1:
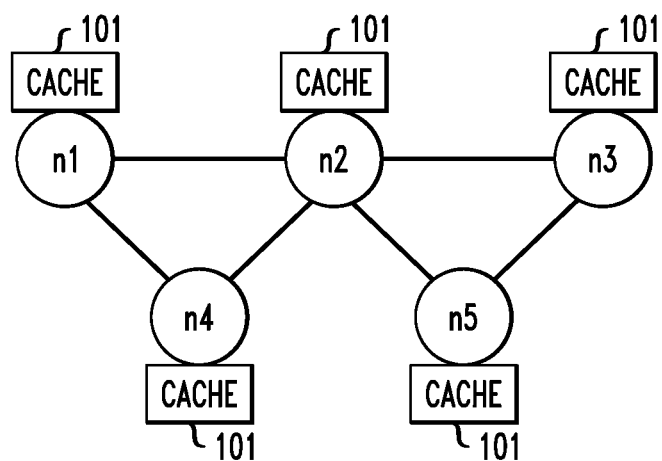
FIG. 1 depicts an information system in accordance with an embodiment of the invention.

Illustrative embodiments of the invention will be described herein in the context of one or more illustrative information systems. However, it is to be understood that principles of the invention are not limited to any particular information system and may be implemented in systems other than the illustrative ones described herein.

As used herein, the term "provenance" refers to an indication or determination of where a given object, such as a unit of data, came from, or an indication or determination of one or more objects from which the given object was derived. That is, the term "provenance" refers to the history or lineage of a given object. Thus, "provenance information" or "provenance data" is information or data that provides this indication or results of such determination.

Furthermore, as used herein, the phrase "data object" or simply "object" refers to any given data item or data unit that may be part of an information network. An object or data object may take on any form and it is to be understood that the invention is not limited to any particular form. For example, an object may be electronic data such as one or more web pages, documents, records, files, images, videos, or any other type of data set, data item, or data unit. Thus, the invention is not limited to any particular type of data object.

By way of additional example only, data objects could be scholarly research papers. The provenance information for a paper could be the bibliographic references cited in the paper. In some situations, the provenance information could be just a subset of the bibliographic references, such as the references cited in the related work section. In other cases, the provenance information could include all of the bibliographic references. In some cases, provenance information for a paper could include other references. For example, if paper A cites paper B which in turn cites paper C, then paper C could be considered to be provenance information for paper A.

Still further, as used herein, a "node" refers to any processing, computing and/or communication element in the information system.

Also, as used herein, the term "overhead" refers to overhead refers to a cost for performing a computation such as CPU cycles, memory consumed, storage consumed, network bandwidth consumed, etc.

It is often desirable to have information on the provenance of a data object. Provenance information can indicate how a data object got to its current state. It can be in several forms. For example, provenance information could indicate how a particular object O is created from multiple constituent objects $c_1, c_2, \ldots, c_n$. It could also indicate the data sources resulting in object O.

Information systems are comprised of one or more nodes (e.g., processors, servers, computing devices, communication devices, etc.) which communicate with each other. One or more of the nodes may be remote from one or more other nodes, or the nodes could all be co-located. Principles of the invention are not limited to any particular information system architecture or layout.

It is realized that it may be desirable to disseminate provenance information throughout the information system. When provenance information is disseminated throughout an information system, it is realized that it is advantageous to cache (store) the provenance information at nodes throughout the system. Caching this information allows the provenance information to be distributed more efficiently throughout the information system.

Figure 6:
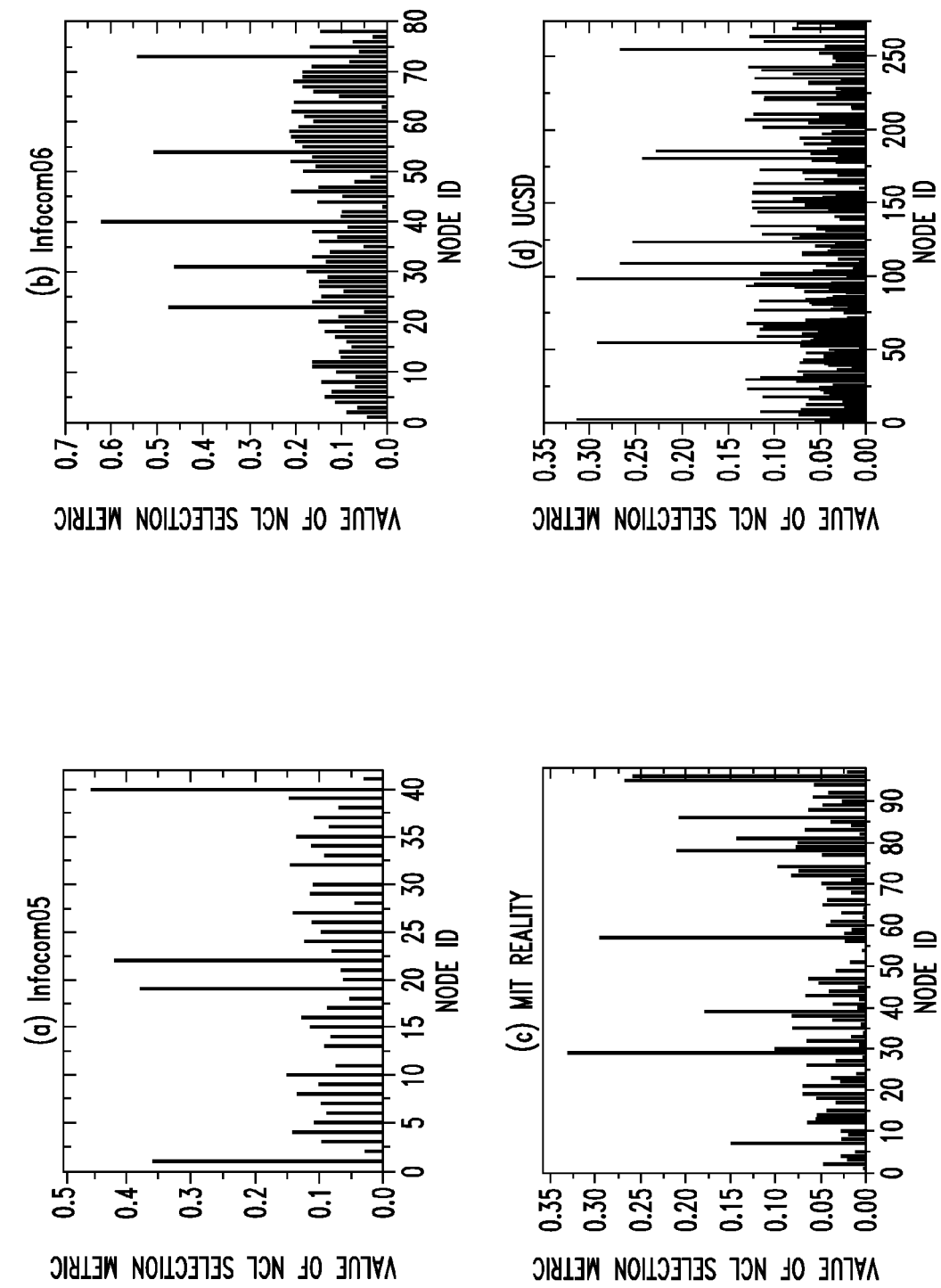
FIGS. 6(a) through 6(d) depict values of a network central location selection metric on exemplary traces in accordance with an embodiment of the invention.

FIG. 1 depicts an information system 100 with nodes n1, n2, n3, n4 and n5. Note that the number of nodes can be a number significantly larger than five, but also less than five. Five nodes are used here solely for purposes of illustration of inventive principles. The lines between nodes represent communication links between the nodes. Note that principles of the invention apply to a wide variety of system topologies. Such inventive principles are also applicable to systems in which connectivity is dynamic. For example, connectivity may change over time. The system might be part of a disruption-tolerant network (DTN) in which the nodes are mobile and connectivity with other nodes may be intermittent and changing over time. An illustrative embodiment in a DTN will be described below in the context of FIGS. 4-6.

Assume that the information system 100 allows queries to be made for an object O requesting the provenance of O. Note that a query may be generated by a user of information system 100, and that the "user" may be a human or another computer system. Such queries might have to be propagated throughout multiple nodes of an information system 100. Thus, the nodes of the system in FIG. 1 can cache provenance information for satisfying queries regarding provenance information. This makes it possible to answer provenance queries more quickly and with less overhead. Note in FIG. 1 that each node has a cache 101 associated with it. Caches 101 can store provenance information.

As an example of provenance queries, assume that object O is a scientific research paper. There are multiple provenance queries regarding object O including but not limited to the following:
Find all references from the related work section of object O.
Find all references in the entire paper.
Find all references in object O with an author who is also an author of object O.
Recursively get all references in the paper and references contained in other references published since 1980.

A key aspect of the invention is that provenance data for object O can be aggregated from simpler cached provenance information. For example, object O may be comprised of three constituent objects $c_1$, $c_2$, and $c_3$. In this case, the provenance information for object O can be obtained by aggregating provenance information from $c_1$, $c_2$, and $c_3$. If the provenance information from $c_1$, $c_2$, and $c_3$ is stored within a cache, then a query for the provenance information corresponding to object O can be satisfied by simply obtaining the cached information. This results in considerably less overhead than if the provenance information has to be computed from scratch.

Figure 2:
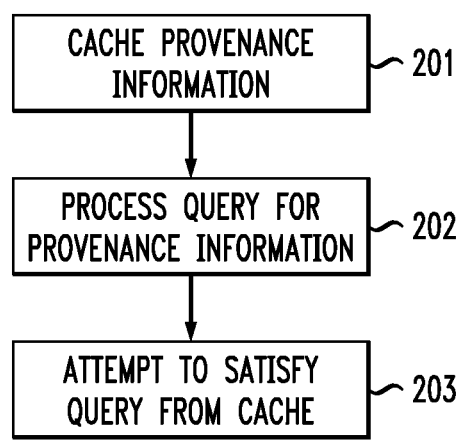
FIG. 2 depicts a method for caching provenance information in accordance with an embodiment of the invention.

FIG. 2 shows a method 200 for satisfying queries for provenance information in accordance with an embodiment of the invention.

In step 201, provenance information is cached. For example, the system 100 may be handling web pages. Web pages may be constructed from fragments $f_1, f_2, f_3, \ldots, f_n$. More information about constructing web pages from fragments is described in the paper "A Publishing System for Efficiently Generating Dynamic Web Content," Jim Challenger, Paul Dantzig, Arun Iyengar, Karen Witting, ACM Transactions on Internet Technology vol. 5, no. 2, May 2005, the disclosure of which is incorporated by reference herein.

A cache 101 could store provenance information for fragments $f_1, f_2, f_3, \ldots, f_n$. In order to make intelligent decisions about what provenance information to cache in step 201, the cache maintains information on how frequently cached provenance information is requested. If an object o1 comprising provenance information is frequently accessed for satisfying provenance queries, then object o1 should be assigned a higher priority for being cached. By contrast, if an object o2 is less frequently accessed for satisfying provenance queries, then object o2 should be assigned a lower priority for being cached.

A relatively simple method for handling cache replacement (i.e., making space for new objects when a cache is full) is least recently used, or LRU. Using this approach, the cached object which was accessed most distantly in the past is the one that is replaced when the cache runs out of space. Another method for handling cache replacement is LRU-K. LRU-K removes the cached object whose kth most recent access was farthest in the past for some positive integer k.

The cache 101 can also take other factors into consideration besides (or in addition to) access frequencies when making caching decision. For example, if two objects o1 and o2 are accessed with similar frequencies but object o1 is much smaller than object o2, then object o1 should be given priority for storing in a cache because object o1 will take up less space. If an object o3 is very expensive to materialize and/or fetch, then object o3 should be given higher preference for caching than an object which is less expensive to materialize and/or fetch. Preference should be given for caching objects with longer expected lifetimes over those with shorter expected lifetimes.

A more sophisticated cache replacement algorithm than LRU is to assign a utility value to each cached object based on factors such as access frequency, size, cost to fetch or materialize, and expected lifetime. The cache then attempts to store objects with the highest utility values in the cache. Since it can be computationally expensive to maintain exact utility values for all objects, there are approximation methods such as greedy-dual-size which allow utility values to be estimated without too much overhead. An example of a greedy-dual-size approximation method is described in "Cost-Aware WWW Proxy Caching Algorithms," Pei Cao and Sandy Irani, Proceedings of USITS '97, December 1997, the disclosure of which is incorporated by reference herein.

In step 202, a query for provenance information about an object o1 is received. Assume this query is made from a client and is directed to at least one server. For example, suppose that object o1 is a web page constructed from fragments f1, f2, and f3. The provenance information for object o1 in this case can be aggregated from the provenance information for f1, f2, and 3.

In step 203, one of the nodes (n1 through n5) of the system 100 attempts to obtain the provenance information by querying the caches 101 to determine if they contain provenance information for object o1. In the case of an information system such as the one in FIG. 1, a node may have to query multiple caches on nodes distributed throughout the system.

If the system (i.e., one or more of the plurality of nodes n1, n2, ..., n5) is able to locate some or all of the provenance information requested for object o1 by querying one or more caches, the cached information is used to compute and return the final result. Note a particular cache 101 might contain some but not all provenance information for object o1. For example, if cache c1 contains provenance information for f1, cache c2 contains provenance information for f2, and cache c3 contains provenance information for f3, then provenance information stored in these three caches can be merged to yield the provenance information for object o1.

If all of the caches 101 are queried and the provenance information is not located in its entirety, the system (i.e., again, one or more of the plurality of nodes n1, n2, ..., n5) could return the portion of provenance information which it was able to locate. Alternatively, there may be one or more data source nodes which could be contacted and queried to obtain the missing information. In general, obtaining provenance information from a data source node is more expensive than obtaining it from a cache. Therefore, if the information is obtained from one or more caches 101, the overhead will be lower.

Figure 3:
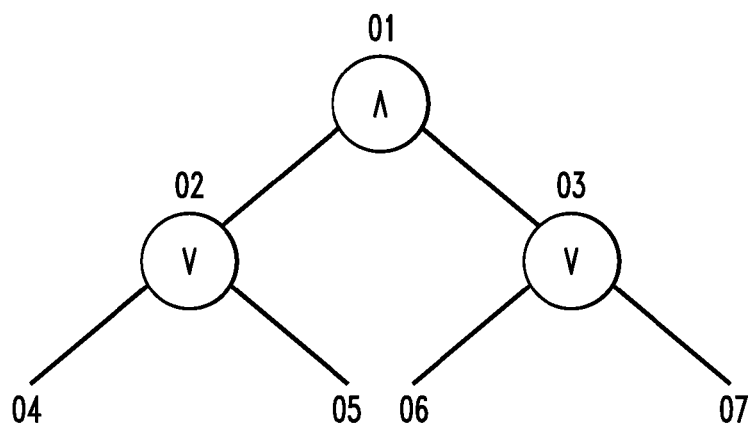
FIG. 3 depicts an object dependency graph in accordance with an embodiment of the invention.

Provenance relationships among objects can be represented by an object dependency graph, an example of which is shown in FIG. 3. One example of a dependency graph may be based on a semi-ring model. Graph 300 depicts provenance relationships among seven objects. The nodes marked V indicate that the provenance information for a node can be computed from the provenance information from any child node. For example, the provenance information for object o2 can be computed from the provenance information for either object o4 or object o5. Nodes marked ^ indicate that the provenance information for a node is computed from the provenance information from all child nodes. For example, the provenance information for object o1 can be computed from the provenance information from object o2 and the provenance information for object o3. In the example in FIG. 3, all nodes have two children. However, in general, a node may have an arbitrary number of children.

We now describe, in the context of FIGS. 4-9, an illustrative embodiment whereby the above-described provenance caching techniques are applied to an information system in the form of a disruption-tolerant network (DTN). As mentioned above, DTNs are characterized by low node density, unpredictable node mobility and lack of global network information. In accordance with principles of the invention, we apply provenance caching to a DTN which enables a user to establish trust in an information product that is obtained by fusing (combining) raw data from one or more information sources (with varying degrees of trust). In particular, principles of the invention are applied to support provenance queries in DTNs using the cooperative in-network caching approach described above.

To address the challenges of opportunistic network connectivity in DTNs, principles of the invention intentionally cache both data and its provenance at a set of Network Central Locations (NCLs), which can be easily accessed by other nodes in the network. Correspondingly, queries are forwarded to these NCLs for data access. In section I below, we describe the concept of NCLs, and in section II, we describe an illustrative provenance caching methodology.

I. Network Central Locations

In this section, we describe how to appropriately select NCLs based on a probabilistic metric evaluating the data transmission delay among mobile nodes in DTNs. The applicability of such selection in practice is then validated by the heterogeneity of node contact patterns in realistic DTN traces.

A. NCL Selection Metric

In order to develop an appropriate metric for NCL selection, we first define the multi-hop opportunistic connection on the network contact graph $G=(V, E)$.

Opportunistic path is defined as follows:

A r-hop opportunistic path $P_{AB}=(V_P, E_P)$ between nodes A and B consists of a node set $V_P=\{A, N_1, N_2, \ldots, N_{r-1}, B\} \subset V$ and an edge set $E_P=(e_1, e_2, \ldots, e_r) \subset E$ with edge weights $\{\lambda_1, \lambda_2, \ldots, \lambda_r\}$. The path weight is the probability $p_{AB}(T)$ that a data item is opportunistically transmitted from A to B along $P_{AB}$ within time T.

Figure 4:
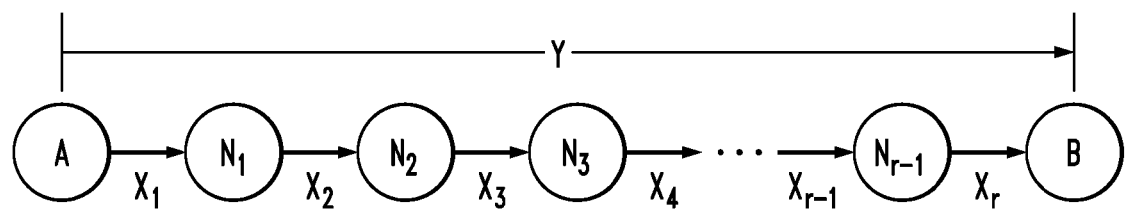
FIG. 4 depicts an opportunistic path in accordance with an embodiment of the invention.

An opportunistic path is illustrated in FIG. 4. The inter-contact time $X_k$ between nodes $N_k$ and $N_{k+1}$, as a random variable, follows an exponential distribution with probability density function (PDF) $px_k(x)=\lambda_k e^{-\lambda_k x}$. Hence, the total time needed to transmit data from A to B is $$Y = \sum_{k=1}^{r} X_k$$

following a hypoexponential distribution, such that:

$$p_Y(x) = \sum_{k=1}^{r} C_k^{(r)} p_{X_k}(x), \quad (1)$$

where the coefficients $$C_k^{(r)} = \prod_{s=1, s \neq k}^{r} \frac{\lambda_s}{\lambda_s - \lambda_k}.$$

From Eq. (1), the path weight is written as:

$$p_{AB}(T) = \int_0^T p_Y(x) dx = \sum_{k=1}^{r} C_k^{(r)} \cdot (1 - e^{-\lambda_k T}), \quad (2)$$

and the data transmission delay between two nodes A to B is measured by the weight of the shortest opportunistic path between the two nodes.

The metric $C_i$ for a node i to be selected as a central node to represent an NCL is then defined as follows:

$$C_i = \frac{1}{N-1} \cdot \sum_{j=1, j \neq i}^{N} p_{ij}(T), \quad (3)$$

where N is the total number of nodes in the network. This metric indicates the average probability that data can be transmitted from a random node in the network to node i within time T, and therefore can also be considered as indicating the average distance from a random node in the network to node i.

In one embodiment, the top K nodes with the highest metric values are selected by the network administrator as the central nodes of NCLs, and such NCL selection is done before any data access operation. A network warm-up period is provided for the administrator to collect information about the pairwise node contact rate, and to calculate the weight of opportunistic paths among mobile nodes. The NCL information is provided by the administrator to each node in the network, and a node maintains its shortest opportunistic path to each NCL. We assume that the set of NCL nodes remain stable over time. As a result, the selected NCLs will not be changed during data access.

B. Trace-Based Validation

The practical applicability of NCL selection is based on the heterogeneity of node contact patterns. In this section, we validate this applicability using realistic DTN traces. These traces record contacts among users carrying hand-held mobile devices at a technical conference and a university campus. The devices equipped with a Bluetooth interface periodically detect their peers nearby, and a contact is recorded when two devices move close to each other. The devices equipped with a WiFi interface search for nearby WiFi Access Points (APs) and associate themselves to the APs with the best signal strength. A contact is recorded when two devices are associated to the same AP. The traces are summarized in the table of FIG. 5. It is to be appreciated that the term "contact" could be defined in ways other than the two examples given above (i.e., proximity for Bluetooth, and common AP for WiFi).

In order to calculate the weight of an opportunistic path according to Eq. (2), we calculate the pairwise contact rates based on the cumulative contacts between each pair of nodes during the entire trace. According to Eq. (2), inappropriate values of T will make $C_i$ close to 0 or 1. Therefore, due to the heterogeneity of the pairwise contact frequency in different traces, different values of T are used adaptively chosen; T is set as 1 hour for the two Infocom traces, 1 week for the MIT Reality trace, and 3 days for the UCSD trace.

The results in FIGS. 6(a) through 6(d) show that the distributions of NCL selection metric values of mobile nodes are highly skewed in all traces, such that the metric values of a few nodes are much higher than that of other nodes. This difference can be up to tenfold in some traces, and validates that the above-described NCL selection metric appropriately reflects the heterogeneity of node contact patterns. As a result, the selected NCLs can be easily accessed by other nodes in the network, which hence ensures the performance of the provenance caching methodology described below in section II.

II. Provenance Caching

Figure 7:
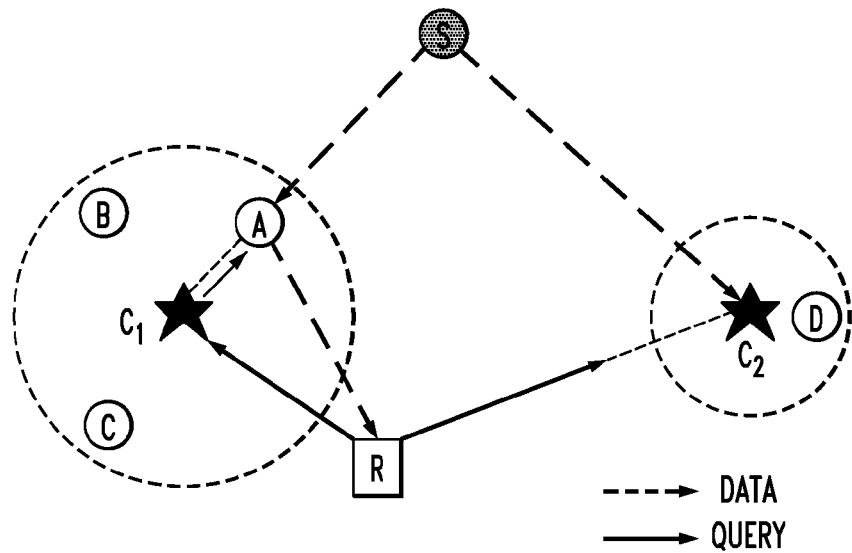
FIG. 7 depicts an information system in accordance with another embodiment of the invention.

In this section, we describe a provenance caching methodology for use in a DTN. As shown in FIG. 7, each NCL is represented by a central node, which corresponds to a star in the figure. The push and pull caching strategies conjoin at the NCLs. The data source S actively pushes its generated data towards the NCLs. If the buffer of a central node C1 is full, data is cached at one or more nodes near a NCL (e.g., node A near C1). Correspondingly, the requester R pulls the data by querying the NCLs, and data copies from multiple NCLs are returned to the requester in order to ensure data accessibility within the time constraint of the query. Note that C2 is another NCL, and that B, C and D are other nodes in the network.

Figure 8:
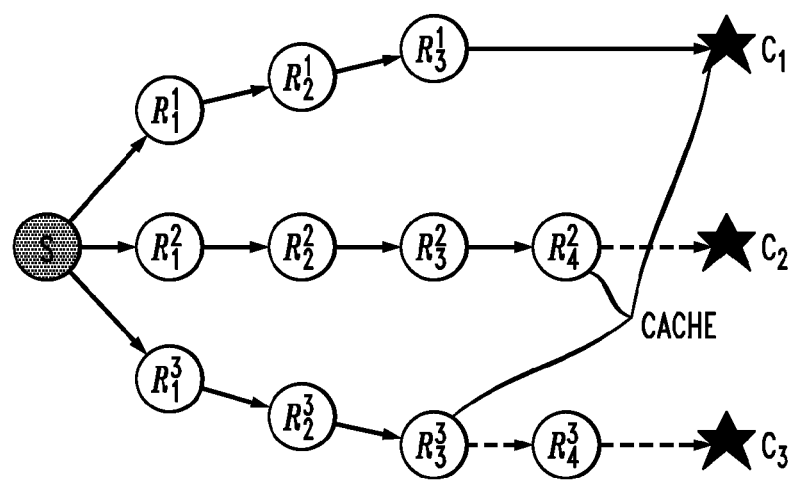
FIG. 8 depicts one step of a method for caching provenance information in accordance with another embodiment of the invention.

The functionality of the application of the provenance caching approach to a DTN is comprised of the following three components:

1) When a data source generates new data, it pushes the data and its provenance expressions to the central nodes of NCLs which are prioritized to cache data. The NCL node stores a copy of all provenance expressions. One copy of data is cached at each NCL; if the caching buffer of a central node is full, another node near the central node will be identified to cache the data. Such decisions are automatically made based on the buffer conditions of nodes involved in the pushing process. This concept is illustrated in FIG. 8. Note that, as shown, the R's are nodes in a computer network. The letter R was used because the nodes relay information throughout the network. These relay nodes are distinct from NCL nodes which are denoted by stars. The subscripts serve to differentiate the nodes from each other.

Figure 9:
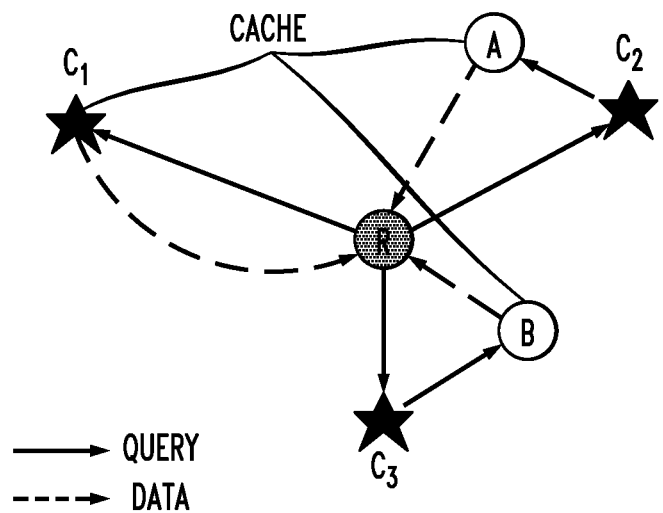
FIG. 9 depicts another step of a method for caching provenance information in accordance with another embodiment of the invention.

2) A requester multicasts a query to the central nodes of NCLs to pull the data, and a central node forwards the query for the data (along with its provenance expression) to the nodes caching the required data items. A number of cached data copies are returned to the requester, and the tradeoff between provenance level, data accessibility and transmission overhead is optimized by probabilistically controlling the number of returned data copies. This concept is illustrated in FIG. 9. As in FIG. 8, stars represent NCL nodes. A, R. and B are nodes in the network. The solid arrow represents a query propagating through the network. The dashed line represents data propagating through the network.

3) Utility-based cache replacement is conducted whenever two caching nodes contact each other, and ensures that high utility data is cached nearer to the central nodes. An approach is provided to quantify utility of a data item based on its marginal impact on the provenance of the requested data and the popularity of the requested data itself. Below, we describe the utility-based caching approach in illustrative detail.

A. Utility-Based Caching

There are two major components that contribute towards the utility of a data item: data popularity and marginal provenance level.

1) Data Popularity: The popularity of a data item in the network is probabilistically estimated based on the occurrences of the past k requests to this data, which happened during the time period $[t_1, t_k]$. We assume that such occurrences of data requests in the past follow a Poisson distribution with the parameter $\lambda_d = k/(t_k - t_1)$, and data popularity is defined as the probability that this data will be requested again in the future before the data expires. If data $d_i$ expires at time $t_e$, the popularity $w_i$ of $d_i$ is written as:

$$w_i = 1 - e^{-\lambda_d \cdot (t_e - t_k)}, \quad (4)$$

which is actually the probability that $d_i$ is requested at least once again in the future before time $t_e$. To calculate the popularity of a data item, a node needs to recursively maintain two time values about the past occurrences of data requests, and therefore will only incur negligible space overhead.

2) Marginal Provenance Level: Besides the popularity of a data item, we quantify the vitality of a data item in establishing the provenance of the requested data item. In order to do so, we examine the provenance expression of data items. For example, given a provenance expression $d=(a \wedge b) \vee c$, the data item c is more important in establishing the provenance of d than data items a or b. In general, we denote a provenance expression as a Boolean monotone function $d=f(a_1, \ldots, a_n)$. The contribution of data item $a_i$ towards the provenance of d is quantified as:

$$w_i^d = \frac{\#f(a_1, \ldots, a_{i-1}, 1, a_{i+1}, \ldots, a_n)}{2^{n-1}} \quad (5)$$

Where the notation $a_i$ is overloaded to denote both the data item and 0/1 Boolean variable and $\#f$ denotes the number of satisfiable assignments to Boolean variables $\{a_1, \ldots, a_{i+1}, a_{i+1}, \ldots, a_n\}$ such that $f$ evaluates to true. For example, given $d=(a \wedge b) \vee c$ the marginal provenance levels are given as $$w_a^d = w_b^d = \frac{1}{2} \text{ and } w_c^d = 1;$$

given $d=a \wedge (b \vee c)$ the marginal provenance levels are given as $$w_b^d = w_c^d = \frac{1}{2} \text{ and } w_a^d = \frac{3}{4}.$$

We also set $w_*^d = 0$ for all data items that do not contribute to the provenance of d. Thus, we refer to Eq. (5) as a marginal provenance level or score of a data item and, in one embodiment, this level or score may be computed using the provenance metadata expressed in a semi-ring model.

We note that while counting the number of satisfiable assignments to a general Boolean expression is a NP-hard problem; however, counting such assignments over monotone Boolean expressions is relatively easier. A key observation here is that if for some assignment of $\{a_i\}$, $f(a_1, \ldots, a_n)$ evaluates to true, then for all $a_j=0$ in the satisfiable assignment setting $\alpha_j=1$ retains the satisfiability of $f$ (due to the monotone property).

3) Overall Utility: The overall utility of a data item d depends upon its popularity and the popularity of all data items d' such that the marginal provenance level $w_d^{d'}>0$. Further, assuming finite cache space, we set the overall utility as being inversely proportional to the size of the data item d. Hence, the overall popularity of d and its utility is given by:

$$pop(d) = w_d + \sum_{d' \neq d} w_{d'} * w_d^{d'}$$

$$u_d = \frac{pop(d)}{size(d)}$$

4) Caching Policy: Given an opportunistic contact between two nodes in the DTN, the nodes collectively examine all the data items available in their caches.

Each node caches a data item d (from the aggregate pool of data items) with probability that is proportional to its utility $u_d$. This process is repeated until the cache node runs out of storage space. We observe that high utility items are likely to be cached on both nodes, while low utility items may fade out from the caches.

B. Answering Provenance Queries

As shown in FIG. 9, due to the probabilistic nature of data delivery in DTNs, multiple data copies are replied to the requester from NCLs to ensure that the requester is able to receive data before the query expires. However, only the first data copy received by the requester is useful, and all the others are essentially useless and waste the network bandwidth. This problem is further complicated since there may be multiple ways to establish the provenance of the requested data item— there is evidently a tradeoff between provenance level and networking overhead. Illustrative principles of the invention provide a probabilistic approach to address these challenges and optimize the tradeoff between provenance level and transmission overhead. A main concept behind this illustrative approach is that, having received the query, a caching node probabilistically decides whether to return the cached data to the requester.

We assume that the query is generated with a time constraint $T_q$, and it takes $t_0 < T_q$ for the query to be forwarded from requester R to caching node C. If there is no tight constraint on the network storage and bandwidth, each node is able to maintain the information about the shortest opportunistic paths to all the other nodes in the network. According to the above description, C can determine whether to reply data to R with the probability $w_d^{q*} p_{CR}(T_q - t_0)$, where $w_d^q$ denotes the marginal provenance level of d with respect to query q and $P_{CR}(T_q - t_0)$ denotes the probability that the data can be transmitted from C to R within the remaining time $T_q - t_0$.

Otherwise, a node only maintains the information about the shortest opportunistic paths to the central nodes, and it is difficult for C to estimate the data transmission delay to R. Instead, the probability for deciding the data response is calculated only based on the remaining time $T_q - t_0$ for responding to the query and the marginal provenance level of a data item with respect to the queried data item. In general, this probability should be inversely proportional to $T_q - t_0$, and we calculate this probability as a Sigmoid function $p_R(t)$, where $p_R(T_q) = p_{max} \in (0,1]$ and $p_R(0) = p_{min} \in (p_{max}/2, p_{max})$. This function is written as:

$$p_R(t) = \frac{k_1 * w_d^q}{1 + e^{-k_2 \cdot t}}, \quad (6)$$

$$\text{where } k_1 = 2p_{min}, k_2 = \frac{1}{T_q} \cdot \ln\left(\frac{p_{max}}{2p_{min} - p_{max}}\right).$$

Our approach allows the user to tune the provenance level of a query response by suitably selecting parameters $p_{max}$ and $p_{min}$ (the maximum and minimum response probabilities).

Accordingly, as is evident from the above description, the system probabilistically propagates queries on the DTN based on the desired provenance level of the query response. Furthermore, cache replacement policies are triggered based on contacts in the underlying DTN, and such cache replacement policies exploit both the popularity of a queried data item and its provenance. Still further, the system advantageously uses the marginal provenance scores of data items to prioritize their storage closer to the network central locations (NCLs). In this manner, provenance information is distributed more efficiently throughout the given information system.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 9, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-9, can also include, as described herein, providing a system, wherein the system includes distinct modules (e.g., modules comprising software, hardware or software and hardware). By way of example only, the modules may include but are not limited to node modules and cache modules. These and other modules may be configured, for example, to perform the steps described and illustrated in the context of FIGS. 1-9.

Figure 10:
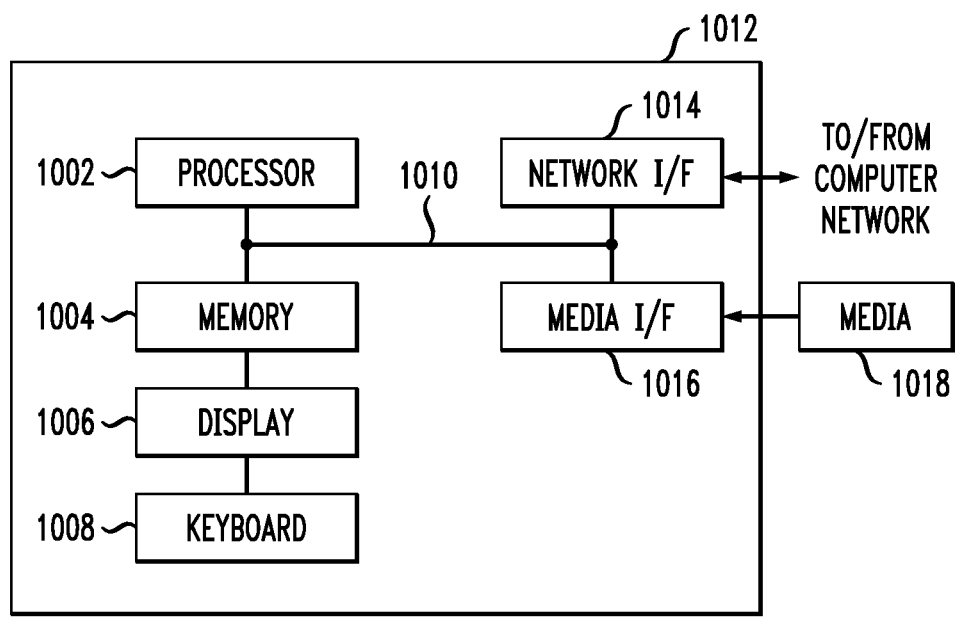
FIG. 10 depicts a computer system in accordance with which one or more components/steps of the techniques of the invention may be implemented.

One or more embodiments can make use of software running on a general purpose computer or workstation. With reference to FIG. 10, such an implementation 1000 employs, for example, a processor 1002, a memory 1004, and an input/output interface formed, for example, by a display 1006 and a keyboard 1008. The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include (but not be limited to) one or more mechanisms for inputting data to the processing unit (for example, keyboard or mouse), and one or more mechanisms for providing results associated with the processing unit (for example, display or printer).

The processor 1002, memory 1004, and input/output interface such as display 1006 and keyboard 1008 can be interconnected, for example, via bus 1010 as part of a data processing unit 1012. Suitable interconnections, for example, via bus 1010, can also be provided to a network interface 1014, such as a network card, which can be provided to interface with a computer network, and to a media interface 1016, such as a diskette or CD-ROM drive, which can be provided to interface with media 1018.

A data processing system suitable for storing and/or executing program code can include at least one processor 1002 coupled directly or indirectly to memory elements 1004 through a system bus 1010. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1008, display 1006, pointing device, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

Accordingly, it is to be understood that the computer architecture 1000 shown in FIG. 10 may represent one illustrative implementation of a node and/or a cache, as shown in FIG. 1. Also, the computer architecture 1000 could represent an illustrative implementation of a client.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In an information system comprising a first computing device requesting provenance data from at least a second computing device, a method for improving the delivery of provenance data to the first computing device, comprising:
   maintaining at least one cache for storing provenance data which the first computing device can access with less overhead than accessing the second computing device;
   producing aggregated provenance data from input provenance data;
   deciding whether or not to cache input provenance data based on a marginal utility of the input provenance data being used to produce aggregated provenance data; and
   computing a marginal provenance score for an item of data using provenance metadata.

2. The method of claim 1, wherein the first computing device and the second computing device communicate over a given network.

3. The method of claim 2, wherein the given network comprises a disruption-tolerant network.

4. The method of claim 2, wherein the at least one cache is maintained by at least one network central location in the given network.

5. The method of claim 4, wherein the at least one network central location is selected based on its accessibility by one or more other nodes within the given network.

6. The method of claim 5, wherein the provenance data is expressed as a dependency graph.

7. The method of claim 6, wherein the dependency graph is based on a semi-ring model.

8. The method of claim 7, wherein the provenance metadata is expressed in the semi-ring model.

9. The method of claim 8, wherein the marginal provenance score of the data item is used to prioritize storage of the data item closer to the at least one network central location.

10. The method of claim 2, further comprising probabilistically propagating at least one query on the given network based on a desired provenance level of a response to the at least one query.

11. The method of claim 2, wherein at least one cache replacement policy is triggered based on one or more contacts in the given network.

12. The method of claim 11, wherein the at least one cache replacement policy exploits the popularity of a queried data item and its provenance.

13. In an information system comprising a first computing device requesting provenance data from at least a second computing device, apparatus for improving the delivery of provenance data to the first computing device, comprising:
   one or more memories; and
   one or more processors coupled to the one or more memories and configured to:
   maintain at least one cache for storing provenance data which the first computing device can access with less overhead than accessing the second computing device;
   produce aggregated provenance data from input provenance data;
   decide whether or not to cache input provenance data based on a marginal utility of the input provenance data being used to produce aggregated provenance data; and
   compute a marginal provenance score for an item of data using provenance metadata.

14. The apparatus of claim 13, wherein the first computing device and the second computing device communicate over a given network.

15. The apparatus of claim 14, wherein the given network comprises a disruption-tolerant network.

16. The apparatus of claim 14, wherein the at least one cache is maintained by at least one network central location in the given network.

17. The apparatus of claim 16, wherein the at least one network central location is selected based on its accessibility by one or more other nodes within the given network.

18. The apparatus of claim 17, wherein the provenance data is expressed as a dependency graph.

19. The apparatus of claim 18, wherein the dependency graph is based on a semi-ring model.

20. The apparatus of claim 19, wherein the provenance metadata is expressed in the semi-ring model.

21. The apparatus of claim 20, wherein the marginal provenance score of the data item is used to prioritize storage of the data item closer to the at least one network central location.

22. The apparatus of claim 14, wherein the one or more processors are further configured to probabilistically propagate at least one query on the given network based on a desired provenance level of a response to the at least one query.

23. The apparatus of claim 14, wherein at least one cache replacement policy is triggered based on one or more contacts in the given network.

24. The apparatus of claim 23, wherein the at least one cache replacement policy exploits the popularity of a queried data item and its provenance.

25. In an information system comprising a first computing device requesting provenance data from at least a second computing device, an article of manufacture for improving the delivery of provenance data to the first computing device, the article of manufacture comprising a non-transitory computer readable storage medium having tangibly embodied thereon computer readable program code which, when executed, causes one or more processor devices to:
  maintain at least one cache for storing provenance data which the first computing device can access with less overhead than accessing the second computing device;
  produce aggregated provenance data from input provenance data;
  decide whether or not to cache input provenance data based on a marginal utility of the input provenance data being used to produce aggregated provenance data; and
  compute a marginal provenance score for an item of data using provenance metadata.

* * * * *